United States Patent
Kwag

(10) Patent No.: US 11,721,864 B2
(45) Date of Patent: Aug. 8, 2023

(54) BATTERY PACK WITH SEPARATED COOLING CHANNELS AND DISCHARGE PATH

(71) Applicant: SAMSUNG SDI CO., LTD., Yongin-si (KR)

(72) Inventor: Nohyun Kwag, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 265 days.

(21) Appl. No.: 17/106,247

(22) Filed: Nov. 30, 2020

(65) Prior Publication Data

US 2021/0167342 A1 Jun. 3, 2021

(30) Foreign Application Priority Data

Nov. 29, 2019 (KR) ........................ 10-2019-0157508

(51) Int. Cl.

| H01M 50/20 | (2021.01) |
| H01M 10/613 | (2014.01) |
| H01M 10/625 | (2014.01) |
| H01M 10/6557 | (2014.01) |
| H01M 50/24 | (2021.01) |

(Continued)

(52) U.S. Cl.
CPC ......... *H01M 50/20* (2021.01); *H01M 10/425* (2013.01); *H01M 10/613* (2015.04); *H01M 10/625* (2015.04); *H01M 10/6557* (2015.04); *H01M 50/24* (2021.01); *H01M 50/394* (2021.01)

(58) Field of Classification Search
CPC .... H01M 50/20; H01M 50/24; H01M 50/394; H01M 10/613; H01M 10/625; H01M 10/6557; H01M 10/425
See application file for complete search history.

(56) References Cited

U.S. PATENT DOCUMENTS

| 7,683,575 B2 | 3/2010 | Berdichevsky et al. |
| 8,241,772 B2 | 8/2012 | Hermann et al. |

(Continued)

FOREIGN PATENT DOCUMENTS

| CN | 203481285 U | 3/2014 |
| CN | 206976514 U | 2/2018 |

(Continued)

OTHER PUBLICATIONS

DE-102016206463-A1, Translation, Translated on Mar. 31, 2022, Published on Oct. 19, 2017 (Year: 2017).*

(Continued)

*Primary Examiner* — Jimmy Vo
(74) *Attorney, Agent, or Firm* — Lee IP Law, P.C.

(57) ABSTRACT

A battery pack includes battery cells adjacent to each other, each of the battery cells including a vent portion, cooling channels penetrating between adjacent ones of the battery cells, a cell holder to accommodate the battery cells, the cell holder including hollow protruding portions surrounding the cooling channels, respectively, and protruding away from the battery cells, and a separation member on the cell holder, the separation member including open areas opened to accommodate the hollow protruding portions inserted therein, respectively, and a shield area that closes above the vent portion.

23 Claims, 9 Drawing Sheets

(51) Int. Cl.
*H01M 50/30* (2021.01)
*H01M 10/42* (2006.01)

(56) References Cited

U.S. PATENT DOCUMENTS

| | | | |
|---|---|---|---|
| 8,322,393 | B2 | 12/2012 | Hermann et al. |
| 9,627,151 | B2 | 4/2017 | Sengoku et al. |
| 10,158,102 | B2 | 12/2018 | Wu et al. |
| 10,305,074 | B2 | 5/2019 | Yoon |
| 10,396,406 | B2 | 8/2019 | Lee |
| 10,811,734 | B2 | 10/2020 | Gong et al. |
| 10,978,689 | B2 | 4/2021 | Kwag et al. |
| 11,233,285 | B2 | 1/2022 | Kang |
| 11,462,799 | B2 | 10/2022 | Ahn et al. |
| 2005/0110458 | A1 | 5/2005 | Seman, Jr. et al. |
| 2009/0148754 | A1 | 6/2009 | Marchio et al. |
| 2010/0047676 | A1* | 2/2010 | Park .................. H01M 10/6235 429/93 |
| 2010/0047682 | A1* | 2/2010 | Houchin-Miller .......................... H01M 10/613 429/155 |
| 2010/0062329 | A1 | 3/2010 | Muis |
| 2010/0124693 | A1 | 5/2010 | Kosugi et al. |
| 2011/0027622 | A1 | 2/2011 | Hong |
| 2011/0223452 | A1 | 9/2011 | Yoshida et al. |
| 2012/0058368 | A1 | 3/2012 | Yamamoto et al. |
| 2012/0135296 | A1 | 5/2012 | Itoi et al. |
| 2012/0189885 | A1 | 7/2012 | Kishii et al. |
| 2012/0301747 | A1 | 11/2012 | Han et al. |
| 2014/0050967 | A1 | 2/2014 | Fuhr et al. |
| 2014/0227570 | A1 | 8/2014 | Hoshi et al. |
| 2014/0255748 | A1* | 9/2014 | Jan .................... H01M 10/04 429/158 |
| 2015/0118530 | A1 | 4/2015 | Lee |
| 2015/0295280 | A1 | 10/2015 | Cho et al. |
| 2015/0349389 | A1* | 12/2015 | Kobune .................. B60L 50/64 429/90 |
| 2016/0035497 | A1 | 2/2016 | Sengoku et al. |
| 2016/0141585 | A1 | 5/2016 | Berg et al. |
| 2018/0269536 | A1 | 9/2018 | Wei et al. |
| 2018/0316073 | A1 | 11/2018 | Ruehle et al. |
| 2018/0358671 | A1 | 12/2018 | Halsey et al. |
| 2018/0366697 | A1 | 12/2018 | Effering et al. |
| 2019/0067655 | A1 | 2/2019 | Nakamura et al. |
| 2019/0140235 | A1* | 5/2019 | Lindstrom .......... H01M 50/251 |
| 2020/0076022 | A1 | 3/2020 | Kawakami et al. |
| 2020/0112007 | A1 | 4/2020 | Kwag |
| 2020/0147673 | A1 | 5/2020 | Rodenburg et al. |
| 2020/0203788 | A1 | 6/2020 | Kang |
| 2020/0220147 | A1 | 7/2020 | Haino et al. |
| 2020/0251702 | A1 | 8/2020 | Seol et al. |
| 2020/0365866 | A1 | 11/2020 | Lin et al. |
| 2021/0083255 | A1 | 3/2021 | Demont et al. |
| 2021/0359358 | A1 | 11/2021 | George et al. |

FOREIGN PATENT DOCUMENTS

| | | | |
|---|---|---|---|
| CN | 108598311 A | | 9/2018 |
| DE | 102013207357 A1 | | 10/2014 |
| DE | 10 2016 206 463 A1 | | 10/2017 |
| DE | 102016206463 A1 | * | 10/2017 |
| EP | 2 187 465 A1 | | 5/2010 |
| EP | 2 866 295 A | | 4/2015 |
| EP | 3 637 498 A | | 4/2020 |
| JP | 2006-156171 A | | 6/2003 |
| JP | 4193328 B2 | | 12/2008 |
| JP | 2009-187734 A | | 8/2009 |
| JP | 5294575 B2 | | 9/2013 |
| JP | 2014-179289 A | | 9/2014 |
| JP | 2014-197452 A | | 10/2014 |
| JP | 2015-138748 A | | 7/2015 |
| JP | 5873210 B2 | | 3/2016 |
| JP | 2016-534518 A | | 11/2016 |
| JP | 6148406 B2 | | 6/2017 |
| JP | 2018-005984 A | | 1/2018 |
| JP | 2018-116775 A | | 7/2018 |
| KR | 10-2015-0048501 A | | 5/2015 |
| KR | 10-2016-0020645 A | | 2/2016 |
| KR | 10-2016-0138994 A | | 12/2016 |
| KR | 10-2017-0089247 A | | 8/2017 |
| KR | 10-2018-0068993 A | | 6/2018 |
| KR | 10-2018-0088197 A | | 8/2018 |
| KR | 10-2018-0129115 A | | 12/2018 |
| KR | 10-2019-0034019 A | | 1/2019 |
| KR | 10-2019-0022485 A | | 3/2019 |
| KR | 10-2019-0034020 A | | 4/2019 |
| KR | 10-2019-0086853 A | | 7/2019 |
| KR | 10-2019-0087744 A | | 7/2019 |
| KR | 10-2017-0021519 A | | 2/2022 |
| WO | WO 2007/134198 A1 | | 11/2007 |
| WO | WO 2009/011748 A1 | | 1/2009 |
| WO | WO 2014/125642 A1 | | 8/2014 |
| WO | WO 2015/066078 A1 | | 5/2015 |
| WO | WO 2017/047258 A1 | | 3/2017 |
| WO | WO 2018/221004 A1 | | 12/2018 |
| WO | WO 2019/021980 A1 | | 1/2019 |
| WO | WO 2019/143060 A1 | | 7/2019 |
| WO | WO 2019/182117 A1 | | 9/2019 |
| WO | WO 2020/058694 A1 | | 3/2020 |

OTHER PUBLICATIONS

USPTO Office action dated May 10, 2022 for U.S. Appl. No. 17/106,282.
USPTO Office action dated Jul. 13, 2022 for U.S. Appl. No. 17/106,297.
USPTO Office action dated Jul. 25, 2022 for U.S. Appl. No. 17/106,290.
Extended European Search Report dated Jul. 23, 2021 for corresponding EP Patent Application No. 20210460.0.
U.S. Appl. No. 17/106,256, filed Nov. 30, 2020.
U.S. Appl. No. 17/106,282, filed Nov. 30, 2020.
U.S. Appl. No. 17/106,290, filed Nov. 30, 2020.
U.S. Appl. No. 17/106,297, filed Nov. 30, 2020.
U.S. Appl. No. 17/106,303, filed Nov. 30, 2020.
USPTO Final Rejection dated Aug. 26, 2022 for U.S. Appl. No. 17/106,282.
USPTO Rejection dated Aug. 26, 2022 for U.S. Appl. No. 17/106,303.
Extended European Search Report dated Jul. 21, 2021 for corresponding EP Patent Application No. 20210430.3.
Extended European Search Report dated Mar. 17, 2021 for corresponding U.S. Appl. No. 17/106,303.
Extended European Search Report dated Mar. 22, 2021 for corresponding U.S. Appl. No. 17/106,247.
Extended European Search Report dated Mar. 22, 2021 for corresponding U.S. Appl. No. 17/106,290.
Partial European Search Report dated Mar. 26, 2021 for corresponding U.S. Appl. No. 17/106,297.
Partial European Search Report dated Mar. 31, 2021 for corresponding U.S. Appl. No. 17/106,256.
Extended European Search Report dated Apr. 22, 2021 for corresponding U.S. Appl. No. 17/106,282.
Korean Office action dated Jul. 18, 2022 for related KR Patent Application No. 10-2019-0157466.
Korean Office action dated Nov. 8, 2022 in corresponding KR Patent Application No. 10-2019-0157693.
Korean Office action dated Aug. 23, 2022 for corresponding KR Patent Application No. 10-2019-0157680.
USPTO Final Rejection dated Nov. 7, 2022 for related U.S. Appl. No. 17/106,290.
USPTO Final Rejection dated Feb. 10, 2023 for U.S. Appl. No. 17/106,297.
Korean Office action dated Oct. 21, 2022 for corresponding KR Patent Application No. 10-2019-0157508.
European Office action dated Feb. 9, 2023.

* cited by examiner

BATTERY PACK WITH SEPARATED COOLING CHANNELS AND DISCHARGE PATH

CROSS-REFERENCE TO RELATED APPLICATION

Korean Patent Application No. 10-2019-0157508, filed on Nov. 29, 2019, in the Korean Intellectual Property Office, and entitled: "Battery Pack," is incorporated by reference herein in its entirety.

BACKGROUND

1. Field

One or more embodiments relate to battery packs.

2. Description of Related Art

Typically, secondary batteries, unlike primary batteries that are not chargeable, are chargeable and dischargeable batteries. The secondary batteries are used as energy sources of mobile devices, electric vehicles, hybrid vehicles, electric bicycles, uninterruptible power supplies, and the like, in the form of a single battery cell according to a type of an external device to apply, or in the form of a battery pack in which a plurality of battery cells are assembled in one unit.

While compact mobile devices, e.g., mobile phones, may be operated for a certain time with an output of a single battery, when long time driving or high power driving is necessary, e.g., in electric vehicles or hybrid vehicles consuming much power, battery packs may be used due to output and capacity, and the battery packs may increase an output voltage or an output current according to the number of built-in battery cells.

SUMMARY

According to one or more embodiments, a battery pack may include a plurality of battery cells disposed to form a cooling channel penetrating between battery cells neighboring to each other, each of the plurality of battery cells including a vent portion, a cell holder in which each of the plurality of battery cells is assembled, the cell holder including a hollow protruding portion surrounding the cooling channel and protruding in a direction opposite to the plurality of battery cells, and a separation member disposed on the cell holder, the separation member including an open area opened to allow the hollow protruding portion to be inserted therein and a shield area that closes above the vent portion.

For example, the shield area may be formed across the entire area of the separation member except the open area.

For example, the separation member may include a plate-shaped member in which the open area is punched in a hole shape.

For example, a discharge path of a discharge gas discharged from the vent portion may be formed between the shield area of the separation member and each of the plurality of battery cells or between the shield area and the cell holder.

For example, the shield area may form one end of the discharge path having one closed side above the vent portion, and a discharge hole may be formed at another end of the discharge path, the discharge hole being formed to penetrate the cell holder.

For example, the discharge path may be continuously formed from the vent portions of the plurality of battery cells to the discharge hole, and may be formed by a space between the hollow protruding portions continuously connected.

For example, the cooling channel may penetrate the separation member through the open area in a shape surrounded by the hollow protruding portion, to be spatially separated from the discharge path having one side closed by the separation member.

For example, the hollow protruding portion may include a wall body having a circular, overall, or polygonal shape surrounding the cooling channel.

For example, an outer circumference of the hollow protruding portion and an inner circumference of the open area may be assembled in an interference fit with respect to each other.

For example, the open area may include a wall body having an inner circumference of a size that is gradually reduced in a protrusion direction of the hollow protruding portion.

For example, a circuit board electrically connected to the plurality of battery cells may be provided between the cell holder and the separation member.

For example, an open area that is opened to allow the hollow protruding portion to be inserted therein may be formed in the circuit board.

For example, the open area of the circuit board may include a first open area formed separately in a hole shape for each cooling channel, and a second open area formed in a hole shape to be common to neighboring different cooling channels.

For example, the second open area may expose edge parts of a pair of battery cells neighboring to each other, with neighboring different cooling channels.

For example, a connection member may be provided between the edge parts of the battery cells exposed through the second open area and the circuit board.

For example, the first and second open areas may be disposed in an alternate pattern in a row direction of the plurality of battery cells.

For example, different pairs of cooling channels may be formed at both sides of one battery cell of the plurality of battery cells in the row direction of the plurality of battery cells, at least one cooling channel of a pair of cooling channels formed at one side of the one battery cell may be exposed through the first open area, and a pair of cooling channels formed at the other side of the one battery cell may be exposed through the second open area.

For example, the cell holder may include an upper holder in which an upper end portion of each of the plurality of battery cells is assembled and a lower holder in which a lower end portion of each of the plurality of battery cells is assembled, and the separation member may include an upper separation member disposed on the upper holder and a lower separation member disposed on the lower holder.

For example, a circuit board electrically connected to the plurality of battery cells may be provided between the upper holder and the separation member, and the cooling channel may be connected, from the upper separation member, to the lower separation member by penetrating the circuit board, the upper and lower holders, the plurality of battery cells assembled between the upper and lower holders.

For example, an upper duct and a lower duct, in which an inlet and an outlet of a cooling fluid flowing through the cooling channel are formed, may be respectively disposed in the upper separation member and the lower separation member.

For example, an opening may be formed in any one of the upper duct and the lower duct, and a connection portion to which a fluid device is connected may be formed in another duct.

For example, any one of the opening and the connection portion may form an inlet of a coolant flowing through the cooling channel, and another may form an outlet of the coolant flowing through the cooling channel.

For example, the opening and the connection portion may be formed at diagonal positions of the battery pack.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
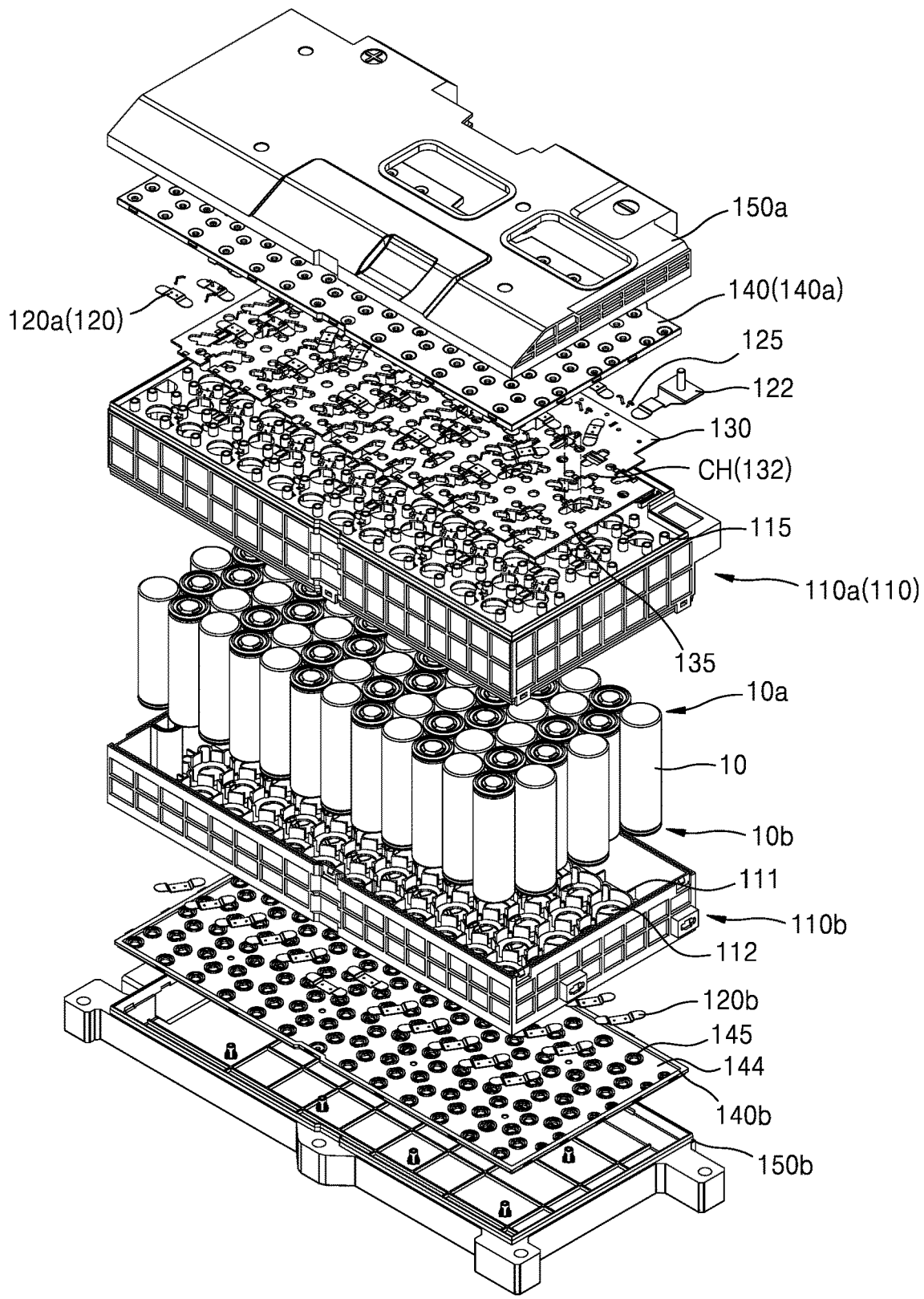
FIG. 1 is an exploded perspective view of a battery pack according to one or more embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

A battery pack according to one or more embodiments is described with reference to the accompanying drawings.

Figure 2:
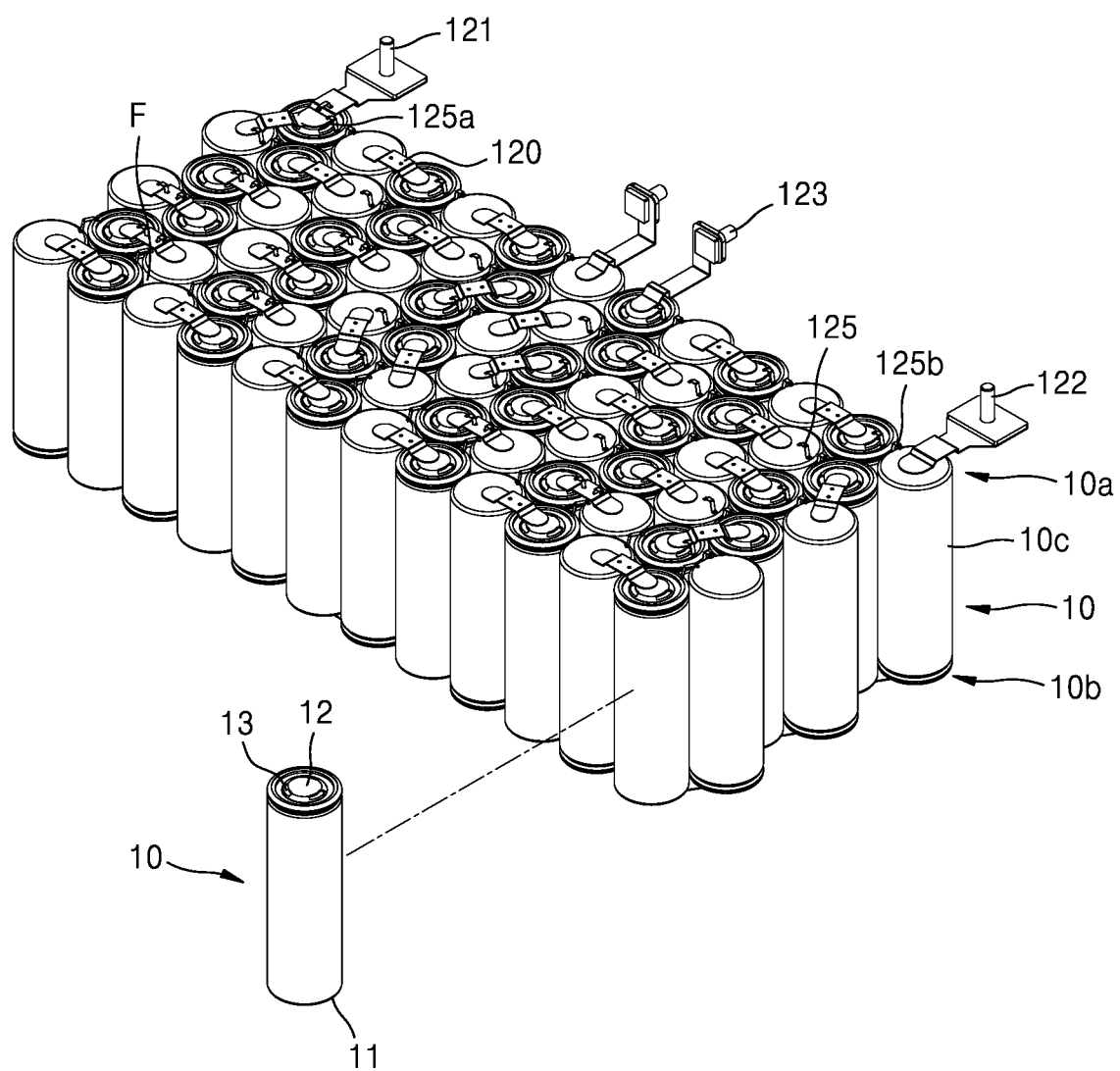
FIG. 2 is a perspective view of a battery cell of FIG. 1.
Figure 3:
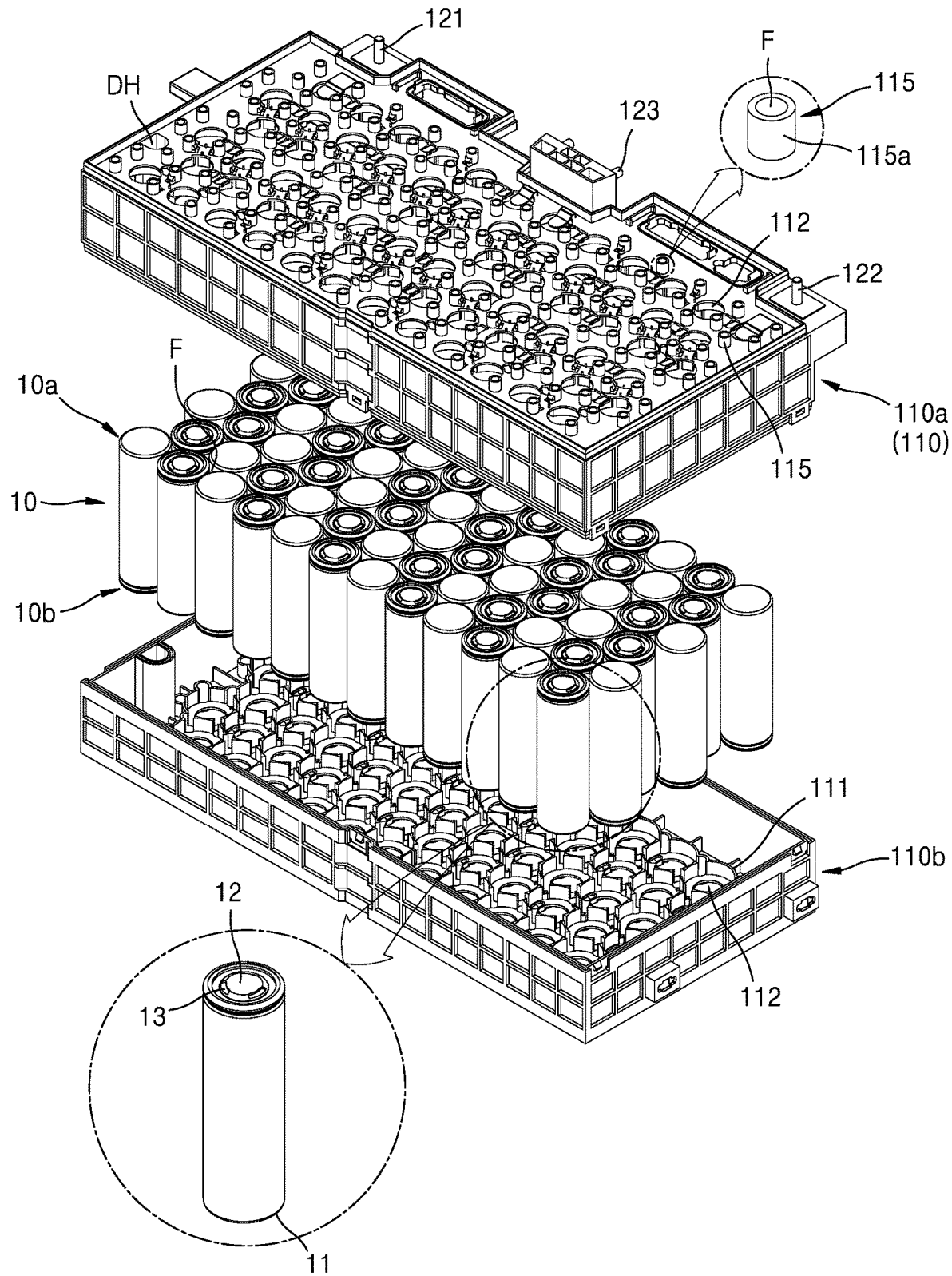
FIG. 3 is an exploded perspective view of a structure of a cell holder in which a battery cell is assembled.
Figure 4:
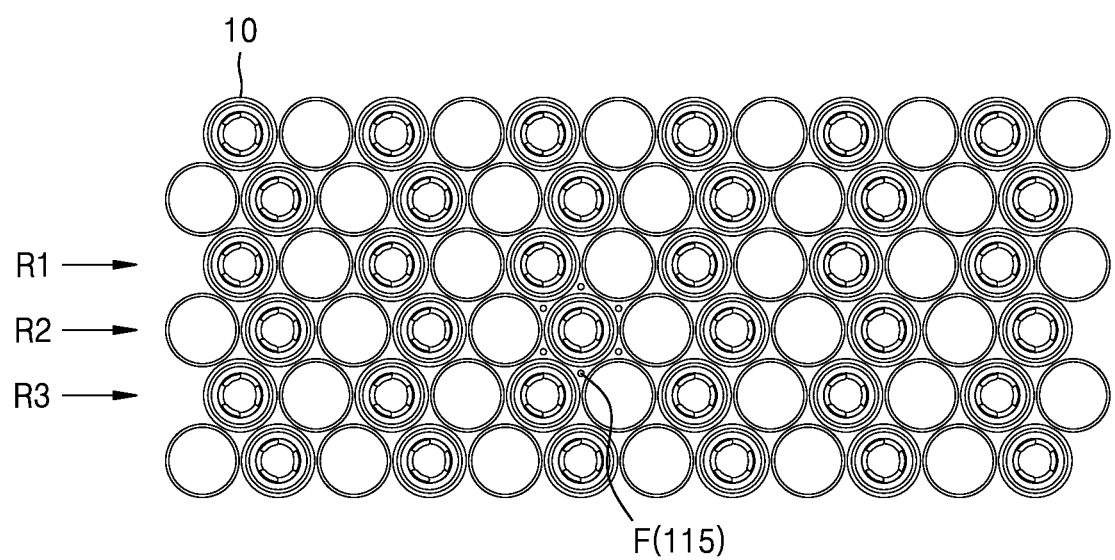
FIG. 4 illustrates the battery cell of FIG. 2 to describe a cooling channel.
Figure 5:
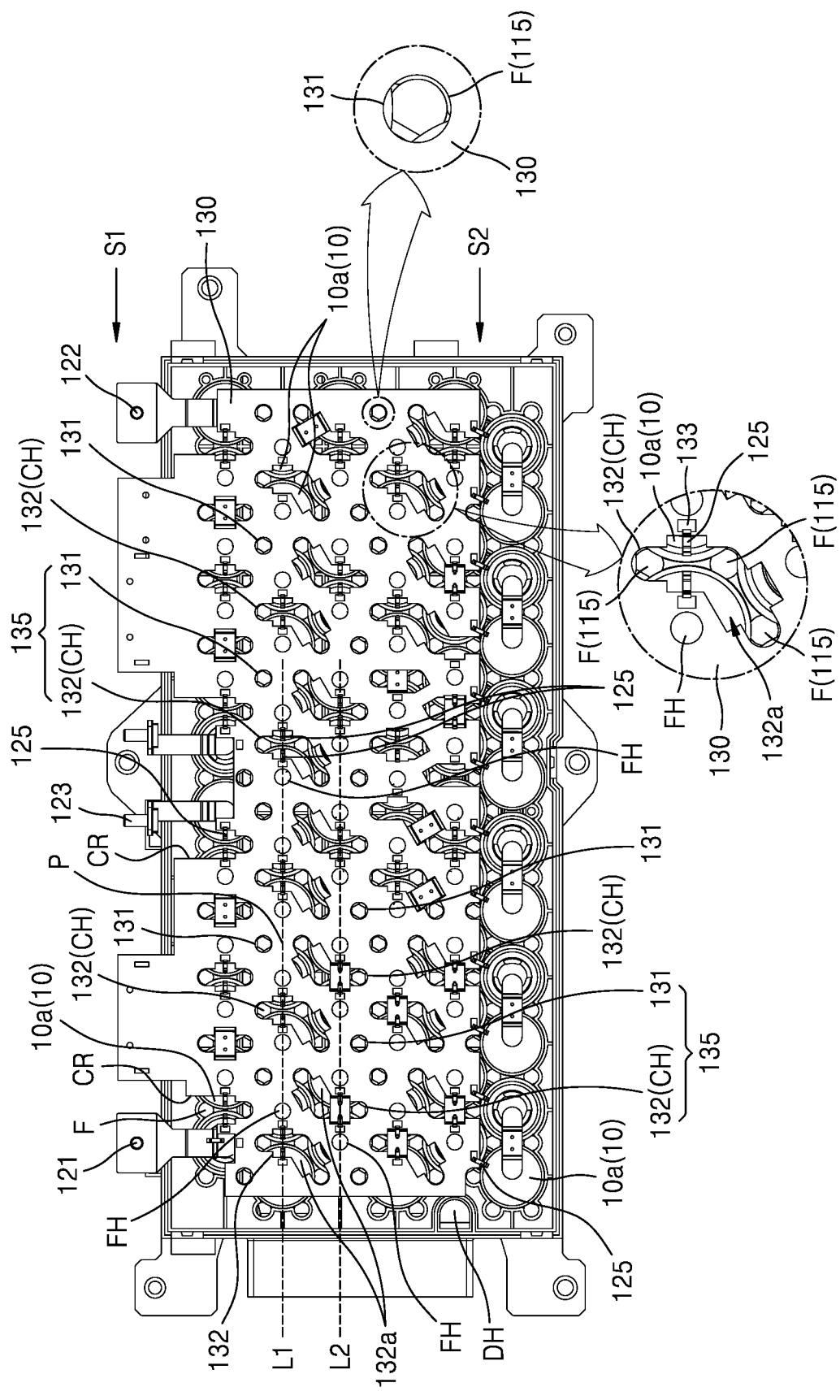
FIG. 5 illustrates the circuit board of FIG. 1.
Figure 6:
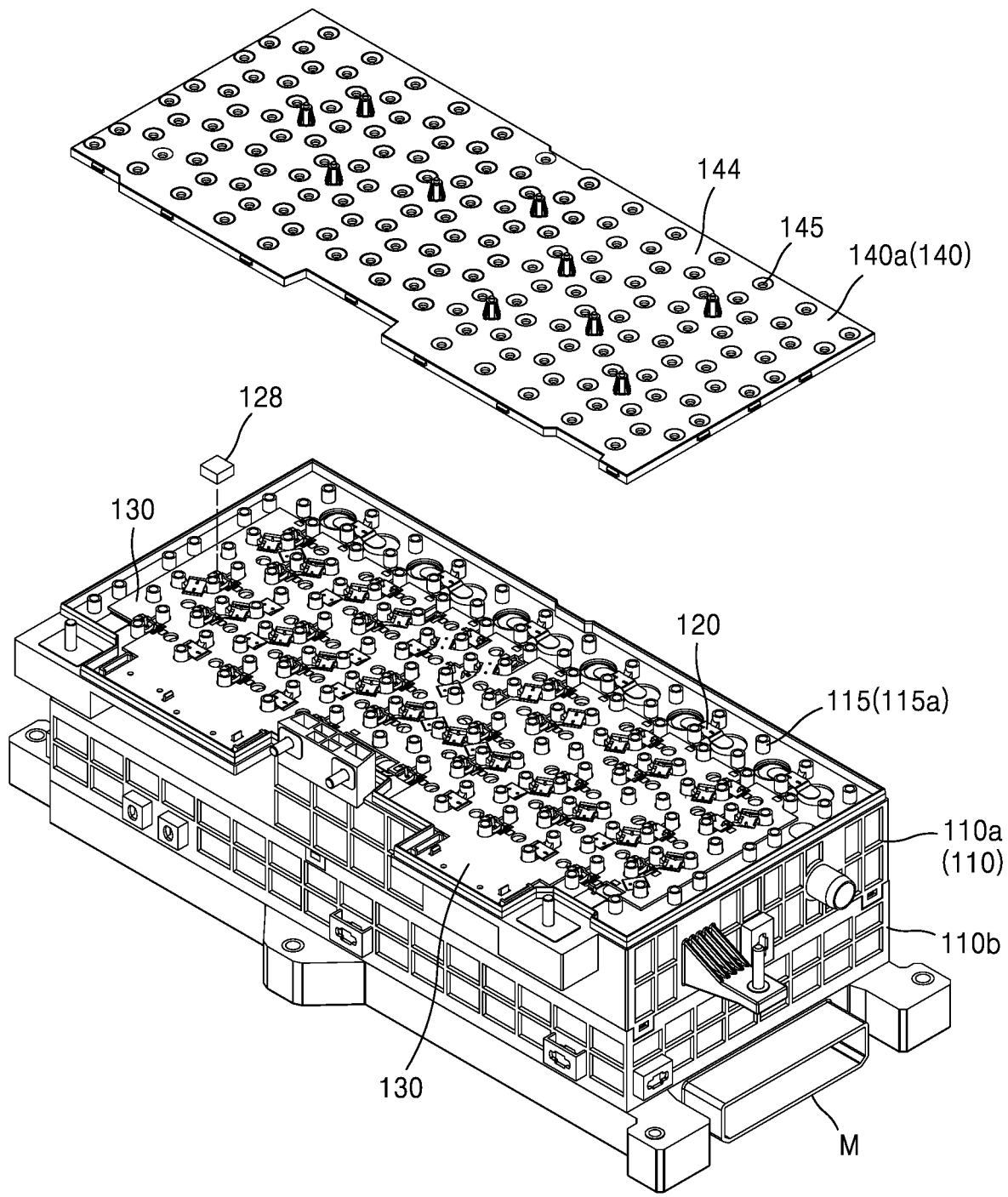
FIGS. 6 and 7 illustrate opposite surfaces of the separation member of FIG. 1.
Figure 7:
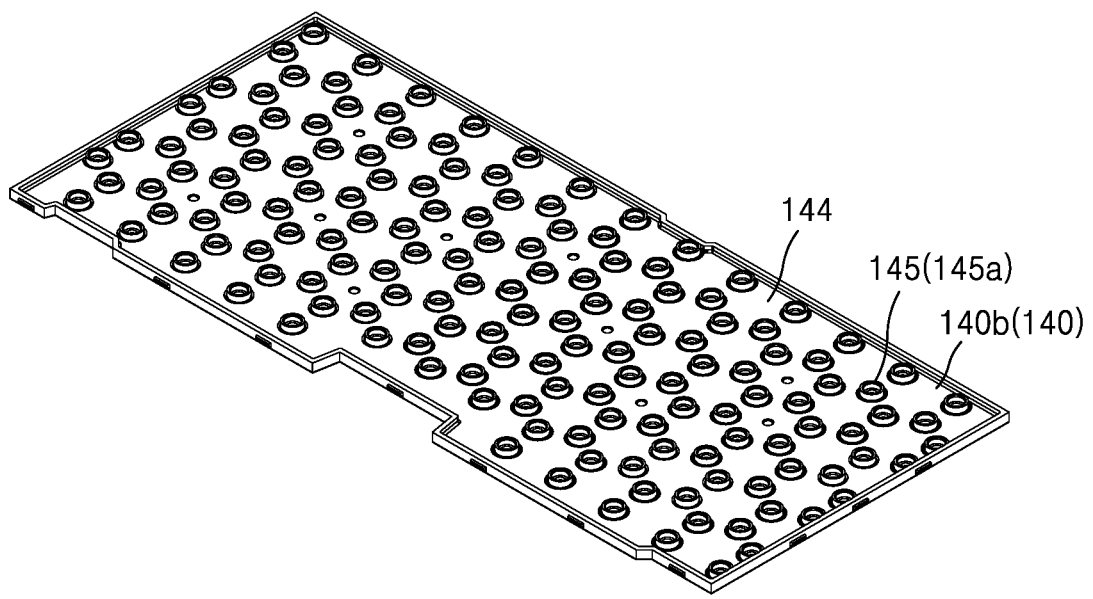
Figure 8:
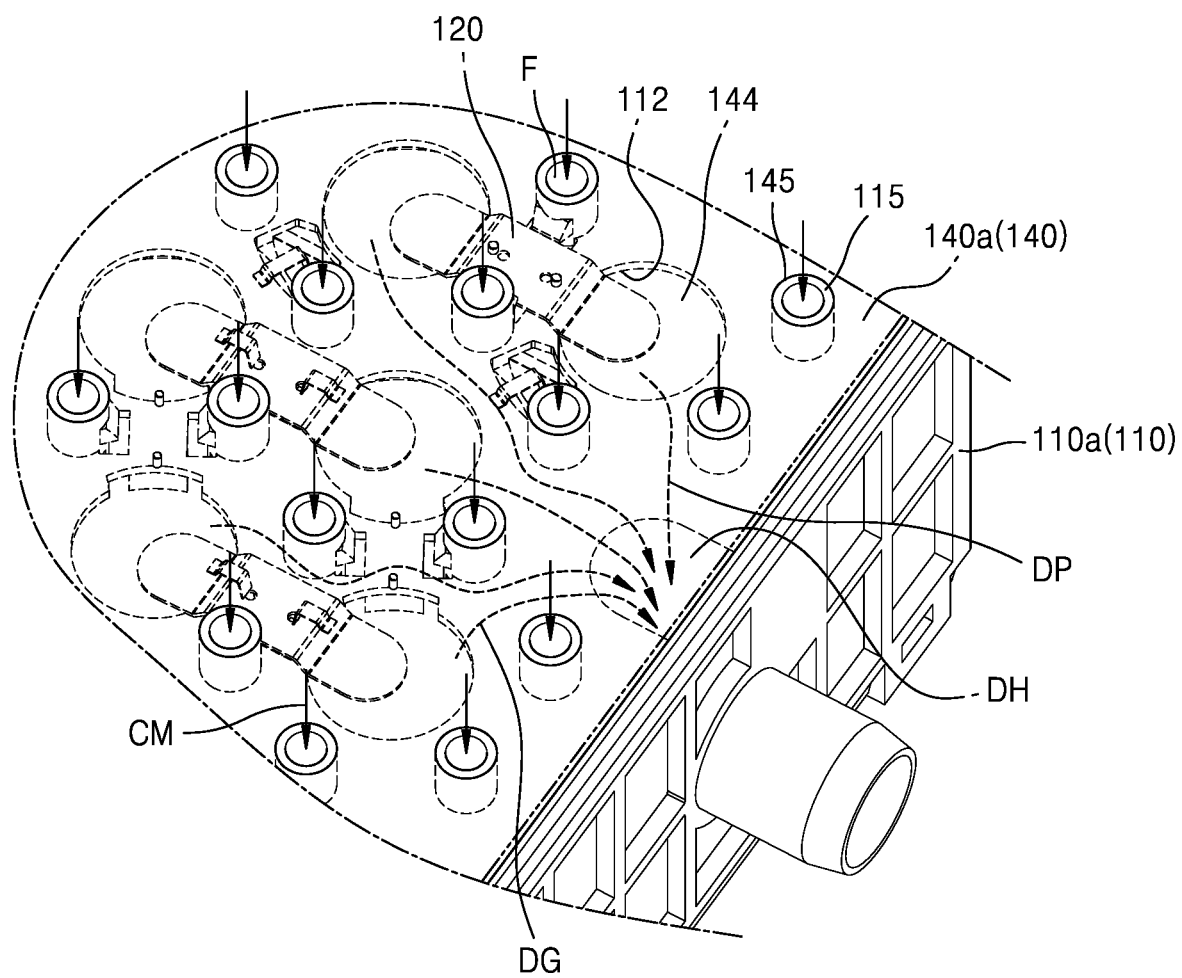
FIG. 8 illustrates a spatial separation of a coolant of a cooling channel from a discharge path by a separation member.
Figure 9:
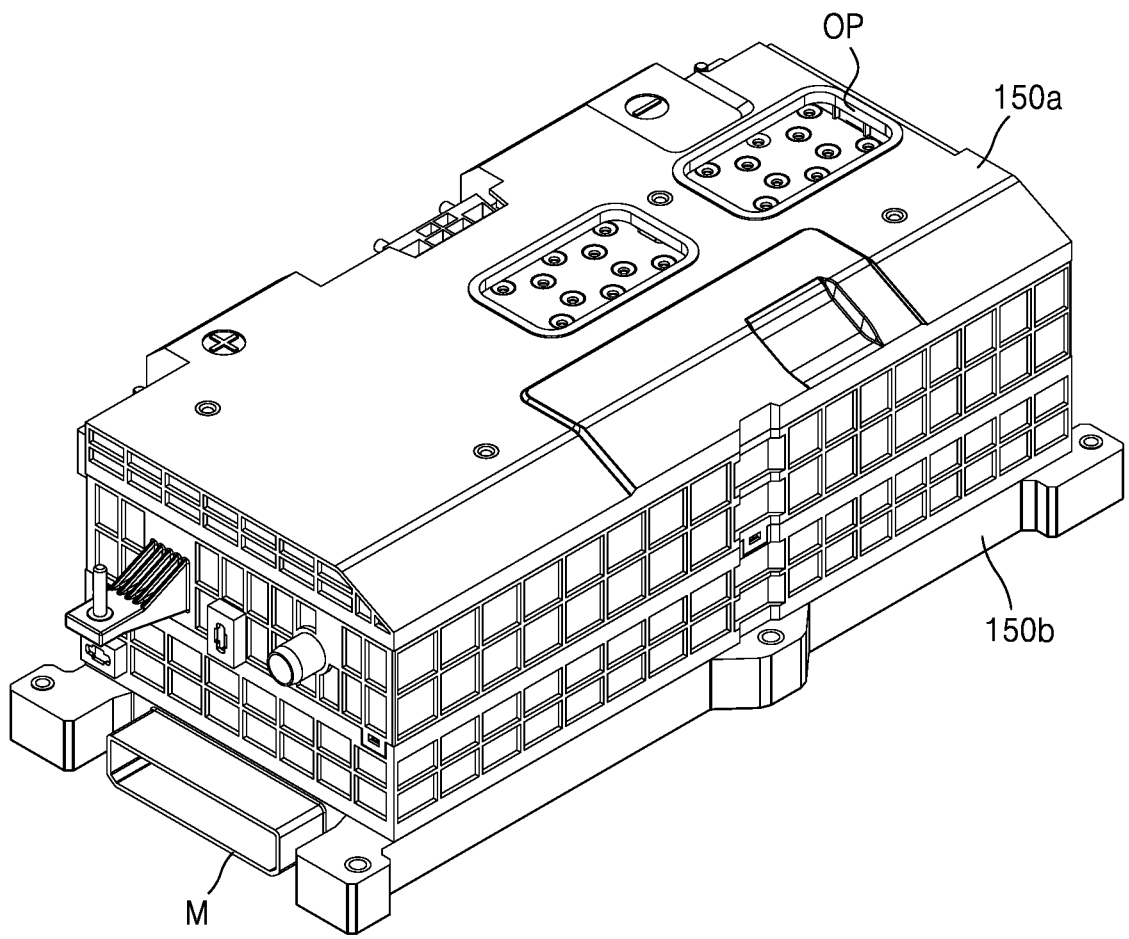
FIG. 9 is an exploded perspective view of an upper duct and a lower duct.

FIG. 1 is an exploded perspective view of a battery pack according to one or more embodiments. FIG. 2 is a perspective view of a battery cell of FIG. 1. FIG. 3 is an exploded perspective view of a structure of a cell holder in which a battery cell is assembled. FIG. 4 illustrates the battery cell of FIG. 2 to describe a cooling channel. FIG. 5 illustrates the circuit board of FIG. 1. FIGS. 6 and 7 illustrate opposite surfaces of the separation member of FIG. 1. FIG. 8 illustrates a spatial separation of a coolant of a cooling channel from a discharge path by a separation member. FIG. 9 is an exploded perspective view of an upper duct and a lower duct.

Referring to FIGS. 1 and 2, a battery pack according to one or more embodiments may include a plurality of battery cells 10, each including a vent portion 13, a cooling channel F formed to penetrate between the battery cells 10 neighboring to each other, and a separation member 140 including a shield area 144 corresponding to the vent portion 13 and an open area 145 extending across the battery cells 10 and opened such that the cooling channel F may penetrate the same.

Referring to FIG. 2, each of the battery cells 10 may be provided as a cylindrical battery cell which may include an upper end portion 10a and a lower end portion 10b in a length direction and an outer circumferential surface 10c having a cylindrical shape between the upper end portion 10a and the lower end portion 10b. First and second electrodes 11 and 12 having polarities different from each other may be respectively formed at the upper end portion 10a and the lower end portion 10b of each of the battery cells 10. For example, the first and second electrodes 11 and 12 of each of the battery cells 10 may correspond to a first polarity, e.g., a negative pole, and a second polarity, e.g., a positive pole, of each of the battery cells 10.

In the present specification, the upper end portion 10a and the lower end portion 10b of each of the battery cells 10 may be classified according to the location thereof, rather than the first and second polarities, which respectively means an end portion formed at an upper position and an end portion formed at a lower position in the length direction of each of the battery cells 10. In other words, according to the specific arrangement of the battery cells 10, the upper end portions 10a of the battery cells 10 neighboring to each other may have the same first polarity or the same second polarity, or the first and second polarities different from each other. As described below, in an embodiment, the battery cells 10 neighboring to each other may be arranged in an alternately reversed pattern in a vertical direction, e.g., the battery cells 10 may alternate in an up or down direction. Accordingly, the upper end portions 10a of the battery cells 10 neighboring to each other may have the first and second polarities different from each other, the lower end portions 10b of the battery cells 10 neighboring to each other may have the first and second polarities different from each other.

One of the battery cells 10 may be electrically connected to another of the battery cells 10 that neighbors thereto, in which the battery cells 10 neighboring to each other may be arranged in the vertically alternately reversed pattern in the electrical connection direction. Accordingly, the first and second polarities different from each other of the battery cells 10 neighboring to each other may be connected in series. However, in another embodiment, the same first and second polarities of battery cells neighboring to each other may be connected in parallel.

In an embodiment, each of a group of the battery cells 10 forming the battery pack may be connected in series to another of the battery cells 10 that neighbors thereto. The battery pack according to an embodiment may not include a parallel connection between the battery cells 10 neighboring to each other. However, a battery pack according to another embodiment may include a serial connection and/or a parallel connection between battery cells neighboring to each other.

In an embodiment, the battery cells 10 neighboring to each other may be arranged in the vertically alternately reversed pattern in the electrical connection direction, and by connecting the upper end portions 10a of the battery cells 10 neighboring to each other or the lower end portions 10b of the battery cells 10 neighboring to each other, to each other, a serial connection between the first and second polarities different from each other may be formed. However, in another embodiment, a parallel connection between the same first and second polarities may be formed.

In the present specification, the electrical connection direction of the battery cells 10 may mean a direction in which the battery cells 10 neighboring to each other are electrically connected to each other, and may include all different directions in which the battery cells 10 are connected to each other through a plurality of busbars 120, rather than any one specific direction.

The cooling channel F may be formed between the battery cells 10 neighboring to each other. A coolant flowing through the cooling channel F may contact and cool the, e.g., external surfaces of the, battery cells 10. The cooling channel F may extend to the outside of the battery cells 10 in the length direction of the battery cells 10 by penetrating between the battery cells 10 neighboring to each other. The cooling channel F that is formed to penetrate almost the entire battery pack may be in fluid communication with the outside of the battery pack through an inlet or an outlet of the cooling channel F. In this state, the cooling channel F may extend across the battery pack to penetrate almost the entire battery pack in the length direction of the battery cells 10. The cooling channel F is described in detail below.

Referring to FIG. 2, the vent portion 13 may be formed in at least any one of the upper end portion 10a or the lower end portion 10b of each of the battery cells 10. When an end portion of each of the battery cells 10 where the vent portion 13 is formed, among the upper end portion 10a and the lower end portion 10b of each of the battery cells 10, is referred to as one end portion of each of the battery cells 10, the vent portion 13 may be formed along an edge of the one end portion of each of the battery cells 10. For example, the vent portion 13 may be formed along an edge of the second electrode 12 that is formed at a center portion of one end portion of each of the battery cells 10, and may be formed along an edge of the one end portion of each of the battery cells 10.

For example, the vent portion 13 may include a plurality of vent portions 13 arranged apart from each other along, e.g., a perimeter of, the edge of one end portion of each of the battery cells 10. The vent portion 13 may remove the internal pressure of the battery cells 10. For example, the vent portion 13 may correspond to a portion of one end portion of the battery cells 10, the portion being formed with relatively weak strength. When the internal pressure of the battery cells 10 increases over a preset critical pressure corresponding to a breaking pressure of the vent portion 13, the vent portion 13 is broken, and thus the internal pressure may be removed. As described below, the discharge gas discharged through the vent portion 13 according to the internal pressure of the battery cells 10 may be discharged to the outside of the battery pack along a discharge path with one side closed by the shield area 144 of the separation member 140. In other words, the shield area 144 corresponding to the vent portion 13 of each of the battery cells 10 may be formed in the separation member 140, the discharge gas discharged through the vent portion 13 may be discharged to the outside of the battery pack through a discharge path formed between the shield area 144 of the separation member 140 and each of the battery cells 10. The separation member 140 and the discharge path will be described in detail below.

Referring to FIG. 3, a cell holder 110 may be assembled to the battery cells 10. The cell holder 110 may include an upper holder 110a into which the upper end portion 10a of each of the battery cells 10 is inserted and a lower holder 110b into which the lower end portion 10b of each of the battery cells 10 is inserted. Except the upper end portion 10a and the lower end portion 10b of each of the battery cells 10 respectively inserted into the upper holder 110a and the lower holder 110b, a central position in the length direction of the battery cells 10 may be exposed between the upper holder 110a and the lower holder 110b, e.g., the upper and lower holders 110a 110b may be vertically spaced apart from each other to expose centers of the battery cells 10 along the vertical direction in an assembled state. In this state, the cooling channel F may be formed between the battery cells 10 neighboring to each other, and the central position of the battery cells 10 exposed between the upper holder 110a and the lower holder 110b may be directly exposed to the coolant flowing in the cooling channel F to be cooled. In an embodiment, the coolant may correspond to low-temperature air introduced from the outside of the battery pack. However, in another embodiment, the coolant may include a coolant in a gaseous state other than air, e.g., a refrigerant gas.

An assembly rib 111 into which the upper end portion 10a of each of the battery cells 10 and the lower end portion 10b of each of the battery cells 10 are inserted may be formed in each of the upper holder 110a and the lower holder 110b. The assembly rib 111 may restrict an assembly position of each of the battery cells 10 by surrounding the upper end portion 10a and the lower end portion 10b of each of the battery cells 10. The assembly rib 111 may protrude from a plate-shaped main body of the cell holder 110 in the length direction of the battery cells 10 in an inward direction toward the battery cells 10, and may surround the upper end portion 10a and the lower end portion 10b of each of the battery cells 10 to support the battery cells 10.

A terminal hole 112 for exposing the first and second electrodes 11 and 12 of the battery cells 10 may be formed in the cell holder 110. The first and second electrodes 11 and 12 of the battery cells 10 exposed through the terminal hole 112 may be electrically connected to another of the battery cells 10 that neighbors thereto, via the busbars 120. For example, the terminal hole 112 may be formed in an area in the cell holder 110, the area being surrounded by the assembly rib 111 in which the upper end portion 10a and the lower end portion 10b of each of the battery cells 10 where the first and second electrodes 11 and 12 are formed are assembled.

As illustrated in FIG. 2, in an embodiment, the vent portion 13 may be formed in at least any one end portion of the upper end portion 10a and the lower end portion 10b of each of the battery cells 10, and the vent portion 13 may be formed along the edge of one end portion surrounding the second electrode 12 formed at the one end portion of each of the battery cells 10. In this state, the terminal hole 112 may be formed in a size or diameter enough to expose the vent portion 13 formed along the edge of the one end portion surrounding the second electrode 12 of each of the battery cells 10, along with the second electrode 12 of each of the battery cells 10. In an embodiment, the battery cells 10 neighboring to each other may be arranged in the vertically alternately reversed pattern. Accordingly, the vent portion 13 of each of the battery cells 10 may be formed in the upper end portion 10a of each of the battery cells 10 according to a detailed position of each of the battery cells 10 or in the lower end portion 10b of each of the battery cells 10. In this state, the terminal hole 112 formed in each of the upper and lower holders 110a and 110b may be formed in a size or diameter enough to expose the vent portion 13 formed in each of the upper end portion 10a and the lower end portion 10b of each of the battery cells 10, e.g., a diameter of the terminal hole 112 may be wider than a diameter defined by the vent portions 13 surrounding the second electrode 12 and may completely overlap and expose the vent portions 13.

The discharge gas discharged through the vent portion 13 of each of the battery cells 10 may flow along the discharge path formed on the cell holder 110 through the terminal hole 112 of the cell holder 110, and may be discharged to the outside of the battery pack through a discharge hole DH formed at one side of the cell holder 110. In other words, the discharge hole DH may be formed at one side of the cell holder 110, and the discharge hole DH may be in fluid communication with the vent portion 13 of each of the battery cells 10 so that the discharge gas discharged from the vent portion 13 may be gathered and discharged to the outside of the battery pack. In detail, the discharge hole DH may be formed at an edge of the cell holder 110, particularly at one edge in a direction along a long side portion of the cell holder 110.

A hollow protruding portion 115 for forming the cooling channel F may be formed in the cell holder 110. The hollow protruding portion 115 may include a hollow portion at the center thereof, forming the cooling channel F, and a wall body 115a surrounding the hollow portion at the center. In an embodiment, the hollow protruding portion 115 may include the wall body 115a having a circular shape and surrounding the hollow portion at the center. However, the technical scope of the disclosure is not limited thereto, and the hollow protruding portion 115 may include the wall body 115a having, e.g., an oval shape or a polygonal shape (e.g., a hexagonal shape), surrounding the hollow portion at the center.

The hollow protruding portion 115 may protrude from the plate-shaped main body of the cell holder 110 outward in a direction opposite to the battery cells 10. For example, the hollow protruding portion 115 may extend the cooling channel F formed between the battery cells 10 neighboring to each other to the outside of the battery cells 10 in the length direction of the battery cells 10, and may form the cooling channel F having a shape surrounded by the wall body 115a.

Referring to FIG. 1, the hollow protruding portion 115 may sequentially penetrate, in the length direction of the battery cells 10, a circuit board 130 and the separation member 140 arranged above the cell holder 110. In this state, the hollow protruding portion 115 may form the cooling channel F extending across the battery pack to penetrate almost the entire battery pack in the length direction of the battery cells 10. In detail, the hollow protruding portion 115 of the upper holder 110a may sequentially penetrate the circuit board 130 and an upper separation member 140a arranged above the upper holder 110a in the length direction of the battery cells 10, e.g., along a longitudinal direction of the battery cells 10 oriented from the lower end portion 10b toward the upper end portion 10a, and the hollow protruding portion 115 of the lower holder 110b may penetrate a lower separation member 140b arranged above the lower holder 110b in the length direction of the battery cells 10. Open areas 135 and 145 that are opened to insert the hollow protruding portion 115 therein may be formed in the circuit board 130 and the separation member 140, respectively. The open areas 135 and 145 of the circuit board 130 and the separation member 140 may be shaped such that a position corresponding to the hollow protruding portion 115 is opened in the circuit board 130 and the separation member 140. The open areas 135 and 145 of the circuit board 130 and the separation member 140 are described in detail below.

The position where the hollow protruding portion 115 is formed along the cell holder 110, or the position of the cooling channel F formed by the hollow protruding portion 115, is described with reference to FIG. 4. In an embodiment, at least a part of the cooling channel F, i.e., a portion where the cooling channel F between the battery cells 10 neighboring to each other extends to the outside of the battery cells 10 in the length direction of the battery cells 10, may be formed by the hollow protruding portion 115, and the cooling channel F and the hollow protruding portion 115 may be formed at positions corresponding to each other, e.g., overlapping each other along a longitudinal direction of the battery cells 10. In other words, the position of the cooling channel F may mean the position of the hollow protruding portion 115.

The cooling channel F may be formed between the battery cells 10 neighboring to each other. In detail, the battery cells 10 may be provided as cylindrical battery cells, and as the battery cells 10 are arranged at alternate positions to be inserted between the battery cells 10 neighboring to each other, the battery cells 10 may be densely arranged, and as the battery cells 10 are densely arranged by using a space between the battery cells 10 neighboring to each other, a battery pack which may reduce ineffective dead space and have relatively high energy density compared to the same area may be provided. For example, the battery cells 10 may be arranged in a row direction of the battery cells 10, and the battery cells 10 in the neighboring rows may be arranged at alternate, e.g., horizontally offset, positions so that the battery cells 10 in the neighboring rows may be inserted with respect to each other, e.g., in a honeycomb or zigzag arrangement. The row direction of the battery cells 10 may mean a direction in which the battery cells 10 are arranged when the battery cells 10 are linearly arranged in one direction. The row direction of the battery cells 10 may be different from a direction in which the battery cells 10 are electrically connected to each other, i.e., the electrical connection direction of the battery cells 10, and the row direction of the battery cells 10 may mean a direction in which the battery cells 10 are arranged, without considering an electrical connection state of the battery cells 10.

For example, referring to FIG. 4, the battery cells 10 of the first and second rows R1 and R2 may be densely arranged close to each other so that the battery cells 10 of the first row R1 may be inserted between the battery cells 10 of the second row R2, e.g., the first row R1 may be horizontally offset relative to the second row R2 in a top view. Similarly, the battery cells 10 of the second and third rows R2 and R3 may be densely arranged close to each other so that the battery cells 10 of the second row R2 may be inserted between the battery cells 10 of the third row R3.

As any one of the battery cells 10 is inserted between the battery cells 10 neighboring to each other, three battery cells 10, e.g., in two rows, are arranged circumferentially adjacent to one another, e.g., two battery cells 10 from the second row R2 and one battery cell 10 from the first row R1 may form a triangle in a top view. In this state, the cooling channel F may be formed between the three battery cells 10 that are circumferentially adjacent to one another, e.g., the cooling channel F may be formed in the center of the resultant tringle of the three battery cells 10. The cooling channel F may be formed in an extra area that is not occupied by the battery cells 10 between the three battery cells 10 that are circumferentially adjacent to one another, i.e., a valley area.

In detail, the cooling channel F may be formed between the battery cells 10 of the first row R1 and the battery cells 10 of the second row R2, which neighbor each other. For example, one cooling channel F may be formed between two battery cells 10 of the first row R1 and one battery cell 10 of the second row R2, and one cooling channel F may be formed between two battery cells 10 of the second row R2 and one battery cell 10 of the first row R1. Similarly, the cooling channel F may be formed between the battery cells 10 of the second row R2 and the battery cells 10 of the third row R3, which neighbor each other. For example, one cooling channel F may be formed between two battery cells 10 of the second row R2 and one battery cell 10 of the third row R3, and one cooling channel F may be formed between two battery cells 10 of the third row R3 and one battery cell 10 of the second row R2.

Referring to FIG. 4, six cooling channels F may be formed in the outer circumferential direction of one battery cell 10 belonging to the second row R2, e.g., six cooling channels F may be formed around a perimeter of one battery cell 10 as viewed in a top view. For example, one battery cell 10 belonging to the second row R2 may form a plurality of valley areas in the outer circumferential direction with six battery cells 10, i.e., the battery cells 10 of the first to third rows R1, R2, and R3, particularly forming a valley area with two battery cells 10 sequentially in the outer circumferential direction, thereby forming a total of six valley areas. As one cooling channel F is formed for each valley area, a total of six cooling channels F may be formed.

Referring to FIG. 3, the cell holder 110 may be provided with first and second output terminals 121 and 122 and a fuse terminal 123 connected to a fuse box. For example, the upper holder 110a may be provided with the first and second output terminals 121 and 122 having polarities different from each other, and the fuse terminal 123 interposed between the first and second output terminals 121 and 122 and for connection to the fuse box that forms a charge/discharge path. The first and second output terminals 121 and 122 may provide an electrical connection between an external device and a group of the battery cells 10 electrically connected to each other. Thus, a group of the battery cells 10 may supply discharge power to an external load through the first and second output terminals 121 and 122 or receive a supply of charge power from an external charger through the first and second output terminals 121 and 122. The first and second output terminals 121 and 122 may be respectively connected to a high potential battery cell 10 having the highest electric potential and a low potential battery cell 10 having the lowest electric potential, among a group of the battery cells 10 electrically connected to each other through the busbars 120.

The fuse box may form a charge/discharge path between the first and second output terminals 121 and 122, and a charge/discharge path of a group of the battery cells 10 may penetrate the fuse box through the fuse terminal 123 connected to the fuse box. A fuse for blocking an overcurrent may be provided in the fuse box and may block the charge/discharge path in response to the overcurrent.

Referring to FIGS. 1 and 2, the busbars 120 may be disposed on the cell holder 110. For example, upper and lower busbars 120a and 120b may be disposed on the upper holder 110a and the lower holder 110b. The busbars 120 may be alternately disposed at alternate positions on the upper holder 110a and the lower holder 110b and may connect the battery cells 10 neighboring to each other in the electrical connection direction. In this state, each of the busbars 120 may electrically connect a pair of the battery cells 10 in the electrical connection direction. Thus, as a plurality of the busbars 120 are arranged in the electrical connection direction of the battery cells 10, an electrical connection of a group of the battery cells 10 may be made.

Referring to FIGS. 1 and 5, the circuit board 130 may be disposed on the busbars 120. The open area 135 (i.e., an opening) opened in a hole shape, which the cooling channel F penetrates, may be formed in the circuit board 130. The cooling channel F may extend across, e.g., through, the circuit board 130 by penetrating the open area 135 of the circuit board 130. For example, as the hollow protruding portion 115 of the cell holder 110 is inserted into the open area 135 of the circuit board 130, the cooling channel F that penetrates the open area 135 of the circuit board 130 may be formed. To this end, the open area 135 of the circuit board 130 may be formed at a position corresponding to the hollow protruding portion 115 of the cell holder 110, in a shape corresponding to the hollow protruding portion 115 of the cell holder 110. In an embodiment, the open area 135 of the circuit board 130 may be formed in a circular shape corresponding to the hollow protruding portion 115 including the wall body 115a having a circular shape surrounding the hollow portion at the center thereof. However, the technical scope of the disclosure is not limited thereto, and the open area 135 of the circuit board 130 may have various shapes corresponding to the hollow protruding portion 115, e.g., various oval and polygonal shapes (e.g., a hexagonal shape). For example, the outer circumference of the hollow protruding portion 115 may be inserted into the inner circumference of the open area 135, and may contact at least a part of the inner circumference of the open area 135 along the inner circumference of the open area 135.

The open area 135 of the circuit board 130 may include a first open area 131 separately formed for each the cooling channel F and a second open area 132 commonly formed with respect to a pair of the cooling channels F neighboring to each other. In the present specification, in connection with the second open area 132, a pair of the cooling channels F neighboring to each other mean a pair of the cooling channels F facing each other with a connection member 125 (described below) therebetween. A detailed technical matter regarding the connection member 125 (i.e., a connector) is described below.

The first open area 131 is separately formed for each cooling channel F in a hole shape separately formed for each cooling channel F, to expose each cooling channel F from the circuit board 130. Unlike the first open area 131, the second open area 132 is provided in a hole shape that is commonly formed with respect to a pair of the cooling channels F neighboring to each other, to include a pair of the cooling channels F neighboring to each other or a pair of the cooling channels F facing each other with the connection member 125 therebetween, and may expose a pair of the cooling channels F neighboring to each other from the circuit board 130. Furthermore, the second open area 132 may expose a part of the upper end portion 10a of each of the battery cells 10 with a pair of the cooling channels F neighboring to each other or a pair of the cooling channels F facing each other with the connection member 125 therebetween. In this state, the upper end portion 10a of each of the battery cells 10 in the connection member 125 may be connected to the upper end portion 10a of each of the battery cells 10 that is exposed through the second open area 132. In other words, the first open area 131 may expose each separate cooling channel F, and the second open area 132 may expose a part of the upper end portion 10a of each of the battery cells 10 with a pair of the cooling channels F neighboring to each other. As the second open area 132 exposes a part of the upper end portion 10a of each of the battery cells 10, one end portion of the connection member 125 may be connected to the upper end portion 10a of each of the battery cells 10 that is exposed from the circuit board 130 through the second open area 132. As the other end portion of the connection member 125 is connected to the circuit board 130, a voltage measurement line may be formed between the battery cells 10 and the circuit board 130, and the second open area 132 may provide a connection hole CH to allow a connection of the connection member 125 across the circuit board 130. A technical matter regarding the connection hole CH is described below in detail.

Referring to FIG. 1, the circuit board 130 may be disposed on the upper holder 110a, but may not be disposed on the lower holder 110b. In other words, the circuit board 130 may be selectively disposed on, e.g. only, one holder of the upper holder 110a and the lower holder 110b. In an embodiment, the circuit board 130 may be disposed on the upper holder 110a, and may gather voltage information about the battery cells 10 through the upper end portion 10a of each of the battery cells 10. In other words, the circuit board 130 may gather the voltage information about the battery cells 10 through, e.g. only, one end portion of the upper end portion 10a and the lower end portion 10b of each of the battery cells 10. For example, the circuit board 130 may gather the voltage information about the battery cells 10 through the upper end portion 10a of each of the battery cells 10.

The battery cells 10 may include the first and second electrodes 11 and 12 different from each other formed on the upper end portion 10a and the lower end portion 10b. According to an embodiment, however, in order to gather the voltage information about the battery cells 10, the circuit board 130 does not need to be connected to both of the upper end portion 10a and the lower end portion 10b of each of the battery cells 10, and the voltage information about the battery cells 10 may be identified through, e.g., only, one end portion of the upper end portion 10a and the lower end portion 10b of each of the battery cells 10, e.g., the upper end portion 10a of each of the battery cells 10. As the voltage information about the battery cells 10 may be all gathered through the circuit board 130 selectively disposed on the upper end portion 10a of each of the battery cells 10, thereby the overall structure of the battery pack may be simplified. In an embodiment, the electrical connection of the battery cells 10 may be made from both sides of the upper end portion 10a and the lower end portion 10b of each of the battery cells 10, and the voltage measurement of the battery cells 10 may be made from the upper end portion 10a of each of the battery cells 10 selectively among the upper end portion 10a and the lower end portion 10b of each of the battery cells 10.

In contrast, if the voltage measurement were to be made from both sides of the upper end portion 10a and the lower end portion 10b of each of the battery cells 10 (unlike the present embodiment), a circuit board would have to be disposed at both sides of the upper end portion 10a and the lower end portion 10b of each of the battery cells 10. Accordingly, the overall structure of a battery pack with multiple circuit boards would have been complicated, and a separate wiring structure to connect the circuit boards at both sides would have been necessary to gather voltage information measured from the circuit boards at both sides.

Referring to FIG. 5, in an embodiment, the second open area 132 may function as the connection hole CH by exposing a pair of the cooling channels F neighboring to each other or a pair of the cooling channels F facing each other with the connection member 125 therebetween, with a part of the upper end portion 10a of each of the battery cells 10. Accordingly, in an embodiment, the second open area 132 and the connection hole CH may indicate substantially the same configuration, e.g., the same hole formed in the circuit board 130. However, in the present specification, for convenience of understanding, separate reference numbers are given to the second open area 132 and the connection hole CH.

A part of the upper end portion 10a of each of the battery cells 10 may be exposed through the connection hole CH or the second open area 132, and the connection member 125 may be connected to the upper end portion 10a of each of the battery cells 10 exposed from the circuit board 130. For example, the connection member 125 may be provided as a conductive wire or conductive ribbon including one end portion connected to the upper end portion 10a of each of the battery cells 10 and the other end portion connected to the circuit board 130. The connection member 125 may be formed through wire bonding for bonding one end portion and the other end portion of a conductive wire respectively to the upper end portion 10a of each of the battery cells 10 and the circuit board 130, or ribbon bonding for bonding one end portion and the other end portion of a conductive ribbon respectively to the upper end portion 10a of each of the battery cells 10 and the circuit board 130. In an embodiment, the conductive wire as the connection member 125 may include a pair of conductive wires connecting the battery cells 10 and the circuit board 130. In case of disconnection of the conductive wire due to lack of mechanical strength, each of the battery cells 10 and the circuit board 130 may be firmly connected by the pair of conductive wires. As the conductive ribbon has a higher mechanical strength than the conductive wire, the conductive ribbon does not need to be provided in a pair in case of disconnection, and thus the battery cells 10 and the circuit board 130 may be electrically connected through a single conductive ribbon. For reference, the connection member 125 illustrated in FIG. 5 as an example may correspond to a conductive ribbon.

The connection hole CH may be formed in an area of the circuit board 130 overlapping a pair of the battery cells 10 neighboring to each other, to expose together a pair of the upper end portions 10a of the battery cells 10 neighboring to each other in the row direction of the battery cells 10. For example, the connection hole CH may be formed in an area of the circuit board 130 overlapping a part of a pair of the battery cells 10 neighboring to each other in the row direction of the battery cells 10, in detail, in an area overlapping edge parts of a pair of the battery cells 10. The connection members 125 different from each other may be connected to the edge parts of the battery cells 10 neighboring to each other exposed through the connection hole CH.

The connection hole CH may be formed in an alternate pattern in the row directions, e.g., L1 and L2, of the battery cells 10 or filling holes FH, to expose a pair of the battery cells 10 neighboring to each other in the row directions L1 and L2 of the battery cells 10 or the filling holes FH. In an embodiment, the first and second open areas 131 and 132 for exposing the cooling channel F may be formed in the circuit board 130. The second open area 132 that functions as the connection hole CH and the first open area 131 that does not function as the connection hole CH may be arranged in the alternate pattern in the row directions L1 and L2 of the battery cells 10 or the filling holes FH. For example, the second open area 132 that functions as the connection hole CH may be formed one by one between a pair of the battery cells 10 or the filling holes FH in the row directions L1 and L2 of the battery cells 10 or the filling holes FH, and the connection hole CH may not be formed between another pair of the battery cells 10 or the filling holes FH. In other words, the second open area 132 may not be formed between the battery cells 10 or the filling holes FH, neighboring to each other, in the row directions L1 and L2 of the battery cells 10 or the filling holes FH, but may be formed at alternate positions between the battery cells 10 or the filling holes FH, neighboring to each other, in the row directions L1 and L2 of the battery cells 10 or the filling holes FH. In this state, among the battery cells 10 or the filling holes FH, neighboring to each other, the first open area 131 for exposing the cooling channel F penetrating between the battery cells 10 neighboring to each other may be formed at a position P where the second open area 132 is not formed, or a position adjacent thereto.

As described below, as the filling holes FH may be formed at central positions in the upper end portions 10a of the battery cells 10, as described above, the arrangement of the first and second open areas 131 and 132 between the battery cells 10 neighboring to each other in the row direction of the battery cells 10 in the alternate pattern may include the arrangement of the first and second open areas 131 and 132 in the alternate pattern at a position adjacent to the position between the filling holes FH neighboring to each other, including the arrangement of the first and second open areas 131 and 132 between the filling holes FH neighboring to each other in the row directions L1 and L2 of the filling holes FH in the alternate pattern. For example, in an embodiment, the first open area 131 may be formed at a position adjacent to the position between the filling holes FH neighboring to each other in the row directions L1 and L2 of the filling holes FH, rather than the position between the filling holes FH neighboring to each other. Even in this state, the first open area 131 may be disposed between the battery cells 10 neighboring to each other. This is because the filling holes FH are formed at the central positions of the battery cells 10 neighboring to each other.

As described with reference to FIG. 4, six cooling channels F may be formed along the outer circumferential direction of one battery cell 10. In this state, four cooling channels F may be formed at opposite sides of any one of the battery cells 10 in the row direction of the battery cells 10. Among the four cooling channels F, at least one of two cooling channels F neighboring to each other formed at one side of the battery cells 10 may be exposed by the first open area 131 separately formed for each cooling channel F, two cooling channels F neighboring to each other formed at the other side of the battery cells 10 may be exposed by the second open area 132 that is commonly formed with respect to the two cooling channels F. As such, with respect to any one of the battery cells 10, the first open area 131 may be formed at one side position, and the second open area 132 may be formed at the other side position. The first and second open areas 131 and 132 may be arranged in the alternate pattern in the row directions L1 and L2 of the battery cells 10 or the filling holes FH. In other words, the second open area 132 that functions as the connection hole CH and the first open area 131 that does not function as the connection hole CH may be arranged in the alternate pattern in the row directions L1 and L2 of the battery cells 10 or the filling holes FH.

The second open area 132 or connection hole CH may be formed in an area enough to include a pair of the cooling channels F neighboring to each other or a pair of the cooling channels F facing each other with the connection member 125 therebetween, with the edge parts of a pair of the battery cells 10 neighboring to each other. For example, a direction in which a pair of the battery cells 10 exposed through the second open area 132 face each other and a direction in which a pair of the cooling channels F or a pair of the cooling channels F facing each other with the connection member 125 therebetween, which is exposed through the second open area 132, face each other may cross each other or cross each other perpendicularly.

In contrast, if one connection hole were to be formed for exposing the edge parts of a pair of the battery cells 10 neighboring to each other and two additional holes were to be formed for exposing each of the cooling channels F neighboring to each other, i.e., a total of three separate holes with a narrow gap therebetween (unlike the present embodiment), a breakage of the circuit board 130, e.g., due to the narrow gaps between the holes, could have been caused. Therefore, according to an embodiment, the edge parts of a pair of the battery cells 10 neighboring to each other and a pair of the cooling channels F neighboring thereto, or a pair of cooling channels F facing each other with the connection member 125 therebetween, are all exposed through a single connection hole CH (or the second open area 132), thereby simplifying the structure of the circuit board 130 and preventing a possible breakage due to an insufficient strength of the circuit board 130

The connection member 125 for electrically connecting the upper end portion 10a of each of the battery cells 10 and the circuit board 130 exposed through the second open area 132 or the connection hole CH may be provided therebetween. The connection member 125 may transmit the voltage information about the battery cells 10 to the circuit board 130. In detail, the connection member 125 may electrically connect the upper end portion 10a of each of the battery cells 10 to a connection pad 133 of the circuit board 130. The connection pad 133 of the circuit board 130 may be formed around the connection hole CH, e.g., a pair of the connection pad 133 respectively electrically connected to a pair of the battery cells 10 neighboring to each other may be formed at positions facing each other around the connection hole CH.

As described below, the filling holes FH for exposing a coupling portion between the busbars 120 and the upper end portion 10a of each of the battery cells 10 may be formed in the circuit board 130. The filling holes FH may be formed at the central position of the upper end portion 10a of each of the battery cells 10 to expose the busbars 120 coupled to the central position of the upper end portion 10a of each of the battery cells 10. In an embodiment, the second open area 132 may include an extension portion 132a extending in the outer circumferential direction to surround the filling holes FH. The second open area 132 or the connection hole CH may expose, in addition to a pair of the cooling channels F neighboring to each other or a pair of the cooling channels F facing each other with the connection member 125 therebetween, another cooling channel F neighboring to the pair of the cooling channels F neighboring each other in the outer circumferential direction of the filling hole FH. For example, the second open area 132 may expose three cooling channels F together. In this state, the three cooling channels F exposed through the second open area 132 may correspond to three cooling channels F continuously arranged in the outer circumferential direction surrounding the filling holes FH. For example, as described in FIG. 4, six cooling channel F may be formed along the outer circumferential direction of one battery cell 10, and among the six cooling channel F, three cooling channels F neighboring to each other may be exposed together through the second open area 132.

Referring to FIG. 5, the second open area 132 extending in the outer circumferential direction of the filling hole FH of rows, for example, the rows L1 and L2, neighboring to each other may be formed in shapes different from each other. For example, in the second open area 132 of the first row L1 extending in the outer circumferential direction of the filling hole FH, the extension portion 132a may extend in a downward direction from the connection member 125 in the outer circumferential direction of the filling hole FH toward the filling holes FH of a second row L2. Unlike the above, in the second open area 132 of the second row L2 extending in the outer circumferential direction of the filling hole FH, the extension portion 132a may extend in an upward direction from the connection member 125 in the outer circumferential direction of the filling hole FH toward the filling holes FH of the first row L1. As such, in the filling holes FH of the first and second rows L1 and L2 neighboring to each other, by forming the extension directions of the extension portion 132a extending in the outer circumferential direction of the filling hole FH to be different from each other, while avoiding interference therebetween, the extension portion 132a having different extension directions may be densely arranged in a narrow space between the filling holes FH of the first and second rows L1 and L2. Although the second open area 132 is described above as extending in the outer circumferential direction of the filling hole FH, in another embodiment, the filling holes FH may be omitted. In this state, the second open area 132 may be understood to be extending in the outer circumferential direction of the central position of the upper end portion 10a of the battery cells 10. The filling holes FH may be formed at the central position of the upper end portion 10a of each of the battery cells 10 to expose the busbars 120 coupled to each other.

At least one connection recess CR may be formed in an edge area of the circuit board 130. The connection hole CH having a shape closed from the outside may be formed in the inside area of the circuit board 130 to expose the upper end portion 10a of each of the battery cells 10, and the connection member 125 is connected to the circuit board 130 through the exposed upper end portion 10a of each of the battery cells 10 so that a voltage measurement may be made. Unlike the above, the connection recess CR having a shape opened to the outside may be formed in the edge area of the circuit board 130 to expose the upper end portion 10a of some of the battery cells 10, and the connection member 125 is connected to the circuit board 130 through the exposed upper end portion 10a of some of the battery cells 10 so that a voltage measurement may be made. For example, the connection recess CR may have a concave shape as the edge area of the circuit board 130 is recessed inwardly. In an embodiment, the connection recess CR may be formed at least one position along a first side S1 of the circuit board 130 neighboring to the first and second output terminals 121 and 122 and the fuse terminal 123. For example, the connection recess CR may be formed along a long side portion side of the circuit board 130 neighboring to the first and second output terminals 121 and 122 and the fuse terminal 123. For example, to avoid physical interference with the first and second output terminals 121 and 122, the fuse terminal 123, and the like, the connection recess CR concavely recessed in a direction away from the first and second output terminals 121 and 122 and the fuse terminal 123 may be formed in the first side S1 of the circuit board 130.

The connection recess CR may expose the upper end portion 10a of each of the battery cells 10 and simultaneously the cooling channel F. For example, the connection recess CR may be formed as a shape extending from an opening to expose the upper end portion 10a of each of the battery cells 10 to an opening to expose the cooling channel F. The connection recess CR may expose one cooling channel F of a pair of the cooling channels F neighboring to each other, and the other cooling channels F may be formed at positions outside the connection recess CR.

The connection hole CH having a shape closed from the outside may be formed in the inside area of the circuit board 130. As the connection recess CR having a shape opened to the outside and inwardly recessed is formed in the edge area of the circuit board 130, a contact position for the connection member 125 may be obtained. In an embodiment, according to a relative position of the circuit board 130 disposed on the upper holder 110a or the battery cell 10 fixed to the upper holder 110a, a part of the upper end portion 10a of each of the battery cells 10 may be exposed through a second side S2 that is flat of the circuit board 130, out of the circuit board 130. The connection member 125 may be connected to the upper end portion 10a of each of the battery cells 10 exposed through the second side S2 of the circuit board 130. In other words, according to a relative position of the circuit board 130 with respect to the upper holder 110a or the battery cell 10 fixed to the upper holder 110a, a part of the upper end portion 10a of each of the battery cells 10 may be exposed out of the circuit board 130. In this state, like the connection recess CR or the connection hole CH, a separate structure to expose the upper end portion 10a of each of the battery cells 10 may not be needed. For example, the second side S2 may corresponding to a side opposite to the first side S1 of the circuit board 130 adjacent to the first and second output terminals 121 and 122 and the fuse terminal 123. The first and second sides S1 and S2 may correspond to the long side portion sides of the circuit board 130 that are opposite to each other.

The filling holes FH that exposes the coupling portion between the busbars 120 and the upper end portion 10a of each of the battery cells 10 may be formed in the circuit board 130. The upper end portion 10a of each of the battery cells 10 may form a first electrode 11 or the second electrode 12 of the battery cells 10, and may be connected by the busbars 120 to be electrically connected to another of the battery cells 10 that neighbors thereto. The filling holes FH may be formed in an area corresponding to the terminal hole 112 of the cell holder 110, and may expose the coupling portion between the upper end portion 10a of each of the battery cells 10 and the busbars 120, which is exposed through the terminal hole 112 of the cell holder 110. The filling holes FH may be filled with potting resin for insulating and protecting the coupling portion between the busbars 120 and the upper end portion 10a of each of the battery cells 10 from the outside. The filling holes FH may provide a filling position of the potting resin to hermetically protect the coupling portion by covering the coupling portion between the busbars 120 and the upper end portion 10a of each of the battery cells 10 by penetrating the circuit board 130. In an embodiment, the coupling portion between the busbars 120 and the upper end portion 10a of each of the battery cells 10 may include a welding portion, and to block harmful components such as air or moisture and prevent time-dependent degradation of the welding portion such as Galvanic corrosion, the coupling portion between the busbars 120 and the upper end portion 10*a* of each of the battery cells 10 may be covered using the potting resin. The potting resin may be formed on a coupling portion between the busbars 120 and the lower end portion 10*b* of each of the battery cells 10. As the potting resin covers the coupling portion between the busbars 120 and the lower end portion 10*b* of each of the battery cells 10, the coupling portion such as the welding portion may be protected from harmful components and may be insulated from the external environment.

Referring to FIG. 6, a thermistor 128 for measuring temperature may be disposed on the circuit board 130. For example, the thermistor 128 may be provided as a chip-type thermistor to be directly mounted on the circuit board 130 through solder mounting. In an embodiment, the thermistor 128 may be mounted on the circuit board 130, and may be disposed at an edge position of the circuit board 130. For example, the thermistor 128 may be disposed at one edge position in a direction along the long side portion of the circuit board 130. A fluid device (e.g., a connection portion M of the fluid device) for forcibly flowing a coolant may be disposed at the other edge position in the direction along the long side portion of the circuit board 130. The long side portion direction of the circuit board 130 may correspond to a direction parallel to the long side portion direction of the battery pack. In an embodiment, as the thermistor 128 is disposed at a position opposite to the fluid device in the long side portion direction of the circuit board 130, according to a heat dissipation structure, temperature information may be obtained from a position having a high possibility of high temperature degradation, that is, a position opposite to the fluid device, local degradation of the battery pack may be sensitively captured, and safety accident such as fire or explosion of the battery cells 10 may be prevented in advance.

Referring to FIGS. 6 to 8, the separation member 140 may be disposed on the cell holder 110. The separation member 140 may spatially separate the cooling channel F of a coolant CM for cooling the battery cells 10 from the discharge path of a discharge gas DG discharged from the vent portion 13 of each of the battery cells 10. In other words, as the separation member 140 spatially separates the cooling channel F from the discharge path, risk of explosion or fire according to a mixture of the discharge gas DG of high temperature and high pressure flowing through the discharge path and the coolant CM such as air flowing through the cooling channel F may be removed. Furthermore, in a battery pack mounted on an electric vehicle, the discharge gas DG may be prevented from being introduced into the interior of the vehicle through an uncontrolled path.

Referring to FIG. 1, the separation member 140 may include the upper separation member 140*a* disposed on the upper holder 110*a* and the lower separation member 140*b* disposed below the lower holder 110*b*. For example, the upper separation member 140*a* may be disposed on the circuit board 130 that is disposed on the upper holder 110*a*. In an embodiment, as the circuit board 130 may not be disposed on the lower holder 110*b*, the lower separation member 140*b* may be directly disposed below the lower holder 110*b*. For example, the lower separation member 140*b* may be disposed on a lower busbar 120*b* disposed on the lower holder 110*b*.

Referring to FIG. 6, the open area 145 that is opened to allow the cooling channel F to penetrate the same may be formed in the separation member 140. The cooling channel F may be formed across the separation member 140 by penetrating the open area 145 of the separation member 140. For example, as the hollow protruding portion 115 of the cell holder 110 is inserted into the open area 145 of the separation member 140, the cooling channel F penetrating the open area 145 of the separation member 140 may be formed. To this end, the open area 145 of the separation member 140 may be formed at a position corresponding to the hollow protruding portion 115, and may have a shape corresponding to the hollow protruding portion 115. In an embodiment, the open area 145 may be formed in a circular shape corresponding to the hollow protruding portion 115 including the wall body 115*a* having a circular shape surrounding the hollow portion at the center. However, the technical scope of the disclosure is not limited thereto, and the open area 145 may have various shapes corresponding to the hollow protruding portion 115, for example, various oval and polygonal shapes, e.g., a hexagonal shape.

Referring to FIG. 7, in an embodiment, the open area 145 may include a wall body 145*a* surrounding the outer circumferential of an opening and extending toward the hollow protruding portion 115, and the wall body 115*a* of the hollow protruding portion 115 may be inserted into the wall body 145*a* of the open area 145. In this state, the wall body 145*a* of the open area 145 and the wall body 115*a* of the hollow protruding portion 115 may be formed in a circular shape corresponding to each other at corresponding positions, and may extend toward each other to be assembled in an interference fit. For example, the outer circumferential of the wall body 115*a* of the hollow protruding portion 115 may be inserted into the inner circumference of the wall body 145*a* of the open area 145, and the wall body 115*a* of the hollow protruding portion 115 and the wall body 145*a* of the open area 145 may be assembled in an interference fit with respect to each other. For example, the wall body 145*a* of the open area 145 may have an inner circumference of a size that is gradually decreased toward the hollow protruding portion 115, or the wall body 115*a* of the hollow protruding portion 115 may have an outer circumference of a size that is gradually increased toward the open area 145. As the wall body 145*a* of the open area 145 or the wall body 115*a* of the hollow protruding portion 115 each have a gradation in a protruding direction toward each other, the wall body 145*a* of the open area 145 and the wall body 115*a* of the hollow protruding portion 115 may be assembled in an interference fit with respect to each other in a direction of being inserted into each other.

Referring to FIGS. 6 and 7, the open area 145 of each of the upper and lower separation members 140*a* and 140*b* may be formed at positions corresponding to each other to form the cooling channel F that penetrates at least a part of the battery pack. The open area 145 of each of the upper and lower separation members 140*a* and 140*b* may form the cooling channel F that penetrates almost the entire structure of the battery pack, with the hollow protruding portion 115 of the cell holder 110 provided between the upper and lower separation members 140*a* and 140*b*, and with the open area 135 of the circuit board 130 provided between the upper and lower separation members 140*a* and 140*b* with the cell holder 110. In detail, the cooling channel F may be connected from the upper separation member 140*a* to the lower separation member 140*b* by penetrating the circuit board 130, the upper and lower holders 110*a* and 110*b*, and the battery cells 10 inserted into the upper and lower holders 110*a* and 110*b*, thereby penetrating almost the entire structure of the battery pack in the vertical direction. To this end, the upper and lower separation members 140*a* and 140*b* and the open area 135 of the circuit board 130 may be formed at positions corresponding to each other, and at a position corresponding to the hollow protruding portion 115 so that the hollow protruding portion 115 of the cell holder 110 is inserted therein.

The separation member 140 may include the shield area 144 formed at a position corresponding to the vent portion 13 of each of the battery cells 10. In the following description, the shield area 144 formed in the upper separation member 140a is mainly described. However, the technical matters of the upper separation member 140a described below may be substantially identically applied to the lower separation member 140b.

Referring to FIG. 8, the shield area 144 may be formed in a shape to close, e.g., completely overlap tops of, the upper portion of the vent portion 13 so that the discharge gas DG discharged from the vent portion 13 of each of the battery cells 10, or the terminal hole 112 that exposes the vent portion 13, is not leaked by penetrating the separation member 140. For example, the shield area 144 may be formed in a closed shape, e.g., as a solid and flat plate with the exception of the open area 145, not such that a part of the separation member 140 is opened, as in the open area 145, to be in fluid communication with the upper and lower portions of the separation member 140, but such that the upper and lower portions of the separation member 140 are not in fluid communication with each other through the shield area 144 and are separated from each other. As the shield area 144 is formed in a closed shape, the lower portion of the shield area 144 where the vent portion 13, or the terminal hole 112 that exposes the vent portion 13, is disposed, may not be in fluid communication with the upper portion of the shield area 144 with respect to the shield area 144.

As such, as the lower portion of the shield area 144 where the vent portion 13, or the terminal hole 112 that exposes the vent portion 13, is disposed, and the upper portion of the shield area 144 are not fluidically connected to each other to be separated from each other with respect to the shield area 144, the discharge gas DG discharged from the vent portion 13, or the terminal hole 112 that exposes the vent portion 13, may not be leaked to the upper portion of the shield area 144 by penetrating the shield area 144. The discharge gas DG discharged from the vent portion 13, or the terminal hole 112 that exposes the vent portion 13, may be blocked by the shield area 144 so as to flow along the discharge path DP, e.g., in an area defined between the shield area 144 and tops of the battery cells 10, and may be discharged, e.g., only, along the discharge path DP to the outside of the battery pack.

The shield area 144 may not be limited to a position corresponding to the vent portion 13 of each of the battery cells 10, or the terminal hole 112 that exposes the vent portion 13, and may be formed across the entire area of the separation member 140, except the open area 145. For example, the shield area 144 may extend to the entire area of the separation member 140 across an area between the open areas 145, except the open area 145 for penetration of the cooling channel F, thereby forming the discharge path continuously connected from the position corresponding to the vent portion 13, or the terminal hole 112 that exposes the vent portion 13, to the discharge hole DH. For example, the discharge gas DG discharged from the vent portions 13, or the terminal holes 112 that expose the vent portion 13, different from each other, may be gathered to the discharge hole DH along the discharge path continuously formed between the shield area 144 of the separation member 140 and the battery cells 10. In an embodiment, the discharge path may be formed between the shield area 144 of the separation member 140 and the battery cells 10 or between the shield area 144 of the separation member 140 and the cell holder 110, or circuit board 130, and may be continuously formed from each vent portion 13 of each of the battery cells 10, or each terminal hole 112 that exposes the vent portion 13, to the discharge hole DH formed at one side of the cell holder 110. For example, the discharge path may be formed in a shape such that a space between the hollow protruding portion 115 inserted into the open area 145 of the separation member 140 is continuously connected. The discharge gas DG gathered to the discharge hole DH through the discharge path may be discharged to the outside of the battery pack.

As such, the discharge path having one side closed by the shield area 144 formed in a close shape to prevent connection between the upper and lower portions of the separation member 140 may be spatially separated from the cooling channel F that penetrates the upper and lower portions of the separation member 140 through the open area 145 of the separation member 140. In detail, the separation member 140 may be formed in a plate shape, particularly in a closed plate shape, except the open area 145 that is opened to allow the hollow protruding portion 115 to be inserted therein. In this state, the cooling channel F surrounded by the hollow protruding portion 115 may penetrate the separation member 140 via the open area 145 and may be spatially separated from the discharged path formed between the separation member 140, or the shield area 144, and the battery cells 10. Accordingly, owing to the structure in which the cooling channel F and the discharge path are spatially separated from each other, a risk of safety accidents as the coolant CM flowing along the cooling channel F and the discharge gas DG having a high temperature and a high pressure and flowing along the discharge path are mixed with each other, causing explosion or fire, may be reduced. In a battery pack mounted on an electric vehicle, as the discharge gas DG is prevented from being introduced into the interior of the vehicle by penetrating the separation member 140, safety of a passenger may be obtained against a toxic gas.

Referring to FIG. 9, an upper duct 150a and a lower duct 150b may be disposed on the upper separation member 140a and the lower separation member 140b, respectively. An opening OP for introducing the coolant may be formed in the upper duct 150a. The coolant introduced into the battery pack through the opening OP may pass along the cooling channel F formed from the upper separation member 140a to the lower separation member 140b, thereby cooling the battery cells 10. The cooling channel F may be formed between the battery cells 10 neighboring to each other, and may cool the battery cells 10 by moving up and down in the length direction of the battery cells 10.

The fluid device for generating a pressure difference between the inside and the outside of the battery pack may be connected to the lower duct 150b to forcibly allow a flow of the coolant to pass the battery pack. For example, the connection portion M of the fluid device may be formed at one side of the lower duct 150b. In an embodiment, the fluid device may be provided as a suction type pump to form the pressure in the battery pack to be a negative pressure, with respect to the outside atmosphere of the battery pack. The fluid device connected to the lower duct 150b may be formed at an outlet of the coolant introduced through the opening OP of the upper duct 150a. In other words, the opening OP of the upper duct 150a may form an inlet of the coolant, and the fluid device connected to the lower duct 150b may form the outlet of the coolant. In another embodiment, the fluid device may be provided as a pump of a blower type. In this case, the fluid device connected to the lower duct 150b may form the input of the coolant, and the opening OP of the upper duct 150a may form the output of the coolant.

As a negative pressure is formed in the battery pack according to the operation of the fluid device, due to a pressure difference between the inside and outside of the battery pack, the coolant may be introduced into the inside of the battery pack through the opening OP of the upper duct 150a. The coolant introduced into the inside of the battery pack may penetrate the cooling channel F and cool the battery cells 10, and may be discharged to the outside of the battery pack through the fluid device connected to the connection portion M of the lower duct 150b.

In an embodiment, the opening OP formed in the upper duct 150a and the fluid device connected to the lower duct 150b may form an inlet and an outlet of the coolant, respectively. Accordingly, the position of the opening OP formed in the upper duct 150a and the position of the fluid device connected to the lower duct 150b, or the position of the connection portion M formed in the lower duct 150b, may be located at diagonal positions in an oblique direction across the battery pack. As such, a flow of the coolant entirely passing the inside of the battery pack may be induced through the opening OP of the upper duct 150a and the fluid device of the lower duct 150b, which are formed at the diagonal positions of the battery pack. In detail, the position of the opening OP formed in the upper duct 150a and the position of the fluid device connected to the lower duct 150b, or the position of the connection portion M formed in the lower duct 150b, may be separated from each other in the long side portion direction of the battery pack. For example, when the position of the opening OP formed in the upper duct 150a, for example, the position of at least some openings OP among the openings OP formed in the upper duct 150a are formed at one edge position in the long side portion direction of the battery pack, the position of the fluid device connected to the lower duct 150b, or the position of the connection portion M formed in the lower duct 150b, may be formed at the other edge position in the long side portion direction of the battery pack. As such, the opening OP formed in the upper duct 150a and the fluid device connected to the lower duct 150b, or the connection portion M formed in the lower duct 150b, are formed at one edge position and the other edge position in the long side portion direction of the battery pack, a flow of the coolant connecting the opening OP of the upper duct 150a to the fluid device of the lower duct 150b may be formed to cross the entire inside of the battery pack.

According to an embodiment, as a coolant flowing along a cooling channel from a discharge path of a discharge gas discharged through a vent portion of a battery cell are spatially separated, a battery pack having improved safety to fundamentally remove risk of explosion or fire due to a mixing of the coolant and the discharge gas may be provided. Furthermore, in a battery pack mounted on an electric vehicle, a discharge gas may be prevented from being introduced into the interior of the vehicle along an uncontrolled discharge path.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A battery pack, comprising:
battery cells adjacent to each other, each of the battery cells including a vent portion;
cooling channels extending between adjacent ones of the battery cells;
a cell holder to accommodate the battery cells, the cell holder including
hollow protruding portions surrounding the cooling channels, respectively, and protruding away from the battery cells; and
a separation member on the cell holder, the separation member including:
open areas opened to accommodate the hollow protruding portions inserted therein, respectively, and
a shield area that closes above the vent portion.
2. The battery pack as claimed in claim 1, wherein the shield area overlaps an entire area of the separation member except the open areas.
3. The battery pack as claimed in claim 1, wherein the shield area is plate-shaped, and the open areas are hole-shaped through the shield area.
4. The battery pack as claimed in claim 1, further comprising a discharge path between the shield area of the separation member and each of the battery cells or between the shield area and the cell holder, the discharge path to discharge a discharge gas from the vent portion.
5. The battery pack as claimed in claim 4, wherein:
a first end of the discharged path is defined by the shield area that overlaps a top of the vent portion, and
a second end of the discharge path is defined by a discharge hole, the discharge hole penetrating the cell holder, and the first and second ends being opposite to each other.
6. The battery pack as claimed in claim 5, wherein the discharge path is continuous from the vent portion to the discharge hole, the discharge path being an empty space continuously connected between the hollow protruding portions.
7. The battery pack as claimed in claim 4, wherein the cooling channels penetrate the separation member through the open areas in a shape surrounded by the hollow protruding portions, the cooling channels being spatially separated from the discharge path having one side closed by the separation member.
8. The battery pack as claimed in claim 1, wherein each of the hollow protruding portions includes a wall body having a circular, oval, or polygonal shape surrounding a corresponding one of the cooling channels.
9. The battery pack as claimed in claim 1, wherein an outer circumference of each of the hollow protruding portions and an inner circumference of each of the open areas are assembled in an interference fit with respect to each other.
10. The battery pack as claimed in claim 1, wherein each of the open areas includes a wall body having an inner circumference of a size that is gradually reduced in a protrusion direction of a corresponding one of the hollow protruding portions.

11. The battery pack as claimed in claim 1, further comprising a circuit board electrically connected to the battery cells, the circuit board being between the cell holder and the separation member.

12. The battery pack as claimed in claim 11, wherein the circuit board includes openings, the hollow protruding portions being inserted into the openings, respectively.

13. The battery pack as claimed in claim 12, wherein the openings of the circuit board include:
- at least one first opening having a hole shape, each of the at least one first opening overlapping a single one of the cooling channels; and
- at least one second opening having a hole shape, each of the at least one second opening overlapping adjacent ones of the cooling channels.

14. The battery pack as claimed in claim 13, wherein the at least one second opening exposes edge parts of a pair of the battery cells that are adjacent to each other, with adjacent different cooling channels.

15. The battery pack as claimed in claim 14, further comprising a connector between the edge parts of the pair of battery cells exposed through the at least one second opening.

16. The battery pack as claimed in claim 13, wherein the at least one first opening and the at least one second opening are arranged in an alternate pattern in a row direction of the battery cells.

17. The battery pack as claimed in claim 16, wherein:
- pairs of the cooling channels are at opposite sides of each one of the battery cells in the row direction of the battery cells,
- at least one cooling channel of each one of the pairs of cooling channels at a first side of the opposite sides of each one of the battery cells is exposed through the at least one first opening, and
- the pair of cooling channels at a second side of the opposite sides of each one of the battery cells are exposed through the at least one second opening.

18. The battery pack as claimed in claim 1, wherein:
- the cell holder includes an upper holder in which an upper end portion of each of the battery cells is assembled, and a lower holder in which a lower end portion of each of the battery cells is assembled, and
- the separation member includes an upper separation member on the upper holder and a lower separation member on the lower holder.

19. The battery pack as claimed in claim 18, further comprising a circuit board electrically connected to the battery cells, the circuit board being between the upper holder and the separation member, and the cooling channels are connected from the upper separation member to the lower separation member by penetrating the circuit board, and the upper and lower holders.

20. The battery pack as claimed in claim 18, further comprising an upper duct and a lower duct in the upper separation member and the lower separation member, respectively.

21. The battery pack as claimed in claim 20, further comprising an opening in the upper duct, and a connection portion in the lower duct, a fluid device being connected to the lower duct.

22. The battery pack as claimed in claim 21, wherein one of the opening and the connection portion defines an inlet of a coolant flowing through the cooling channels, and another of the opening and the connection portion defines an outlet of the coolant flowing through the cooling channels.

23. The battery pack as claimed in claim 21, wherein the opening and the connection portion are at diagonal positions of the battery pack.

* * * * *